Jan. 26, 1965 F. M. DAY 3,167,130
RECIPROCATING PROPELLER
Filed Dec. 23, 1963 2 Sheets-Sheet 1
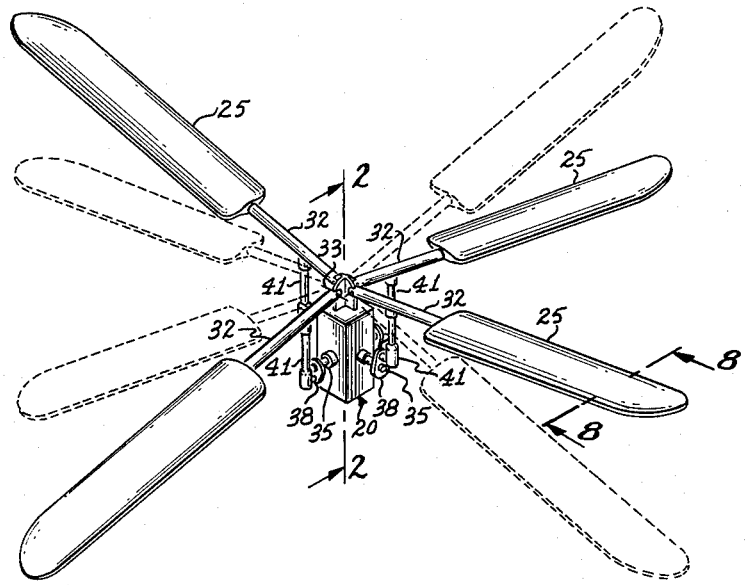
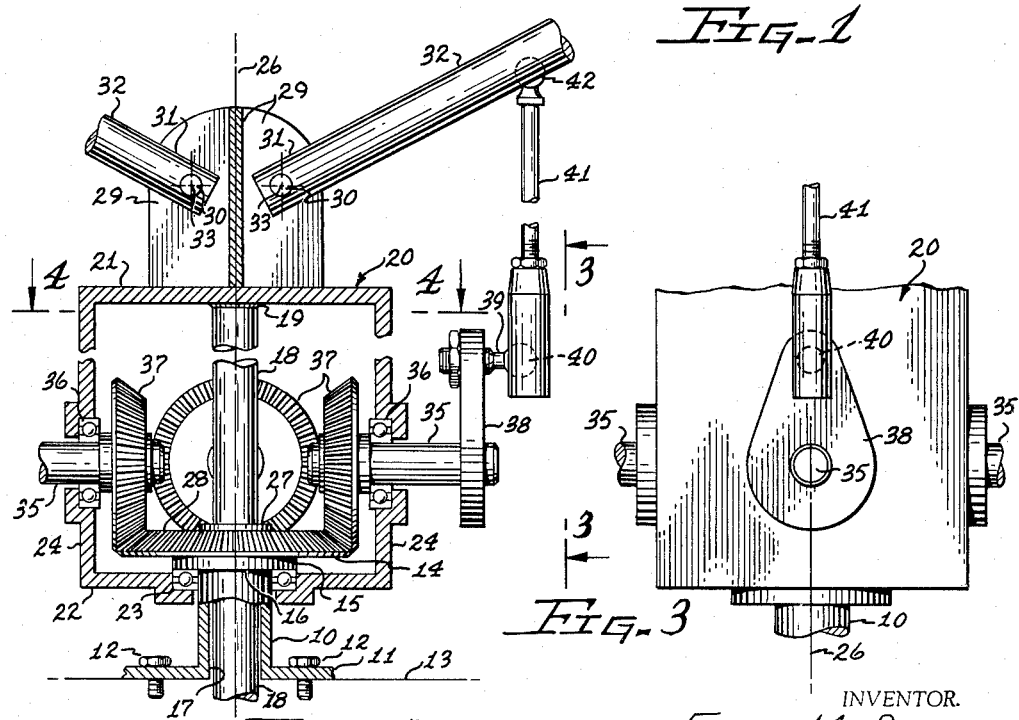
INVENTOR.
FRED M. DAY
BY
Willard S. Growe
ATTORNEY

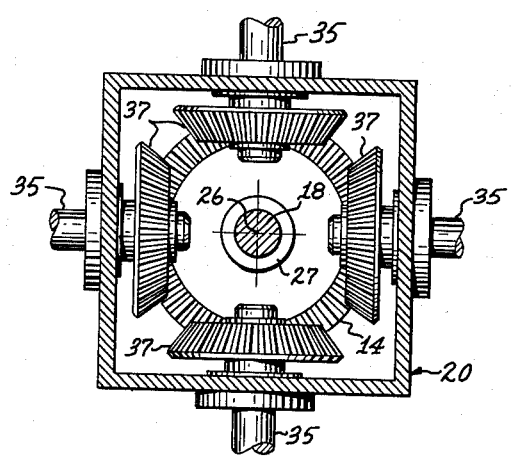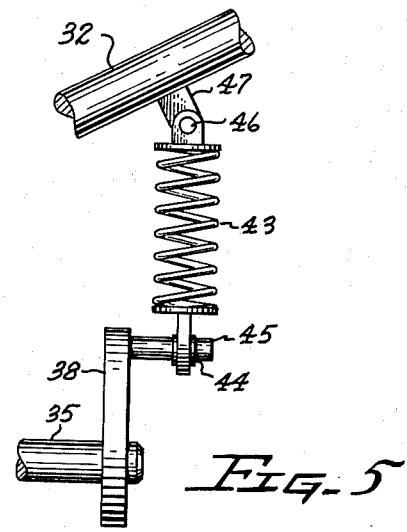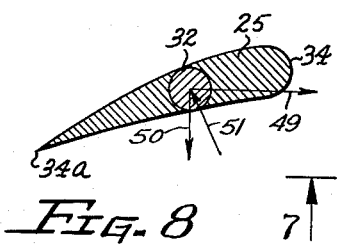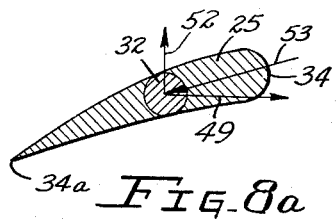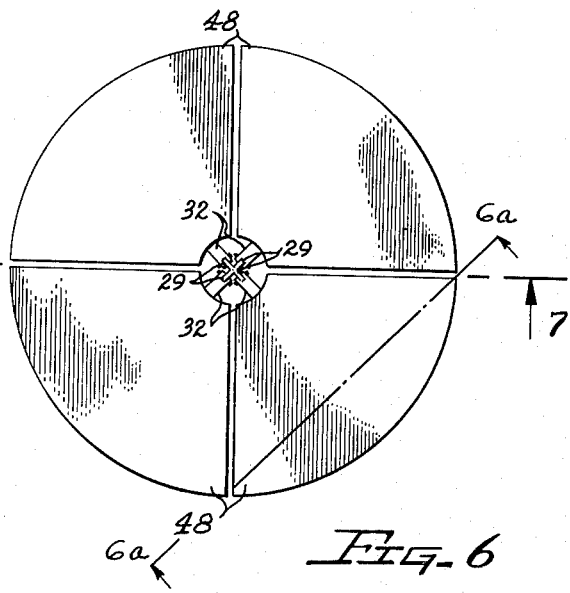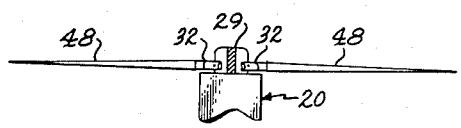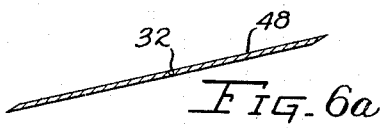

3,167,130
RECIPROCATING PROPELLER
Fred M. Day, 2903 W. Palm Lane, Phoenix, Ariz.
Filed Dec. 23, 1963, Ser. No. 332,729
7 Claims. (Cl. 170—160.1)

This invention pertains to propeller apparatus for aircraft and is particularly directed to reciprocating propeller in which each of the propeller blades reciprocate axially as the propeller rotates in a conventional manner.

One of the objects of this invention is to provide a reciprocating propeller particularly adapted to vertically lift aircraft in which as each blade moves downward a centrifugal force action takes place which forces the compressed air from under the blade, forward and outward, then up over the leading edge of the blade where a vortex action is created causing extreme low pressure above the blade.

Another object is to provide a specially constructed reciprocating propeller in which there is aerodynamic action such as created by the wing of a bee as it is pulled downward in flight so as to provide lift many times the weight of the apparatus.

A further object is to provide a reciprocating aircraft propeller in which the air is moved from the axis or hub of the propeller outward towards the blade tips, both above and below each blade.

It is also an object of this invention to provide a reciprocating propeller structure in which the air under a blade is traveling under compression, while the air above the blade is moving into a low pressure area above the blade and traveling at very high speed creating a Bernoulli's theorum in which the air flow over the upper surface of an airfoil causes suction because the air stream has been speeded up and positive pressure on the lower surface of the airfoil where the airstream has been slowed down, since the pressure of a fluid is proportional to its velocity.

Another object is to provide a reciprocating propeller particularly adapted to helicopter type aircraft in which the propeller produces no down draft ground effect.

A further feature of the reciprocating propeller is that it takes in air from the periphery on the upstroke and then forces it back out the periphery on the downstroke.

And another object is to provide a reciprocating propeller in which each blade moves up and down approximately once for each revolution of the propeller.

Further features and advantages of this invention will appear from a detailed description of the drawings in which:

FIG. 1 is a general perspective view of a reciprocating propeller incorporating the features of this invention.

FIG. 2 is an enlarged fragmentary sectional view on the line 2—2 of FIG. 1.

FIG. 3 is an enlarged fragmentary side elevation indicated by the line 3—3 in FIG. 2.

FIG. 4 is an enlarged fragmentary sectional view on the line 4—4 of FIG. 2.

FIG. 5 is an enlarged fragmentary view of a modified connecting rod construction.

FIG. 6 is a plan view of a modification of the reciprocation propeller structure shown in FIG. 6.

FIG. 6a is a sectional view on the line 6a—6a of FIG. 6.

FIG. 7 is a sectional view on the line 7—7 of FIG. 6.

FIG. 8 is an enlarged sectional view on the line 8—8 of FIG. 1, showing the force acting on a rotor blade as it moves downwardly.

FIG. 8a is an enlarged sectional view similar to FIG. 8 but showing the force acting on a rotor blade as it moves upwardly.

As an example of one embodiment of this invention, there is shown a reciprocating propeller comprising a column 10 having a support flange 11 secured by suitable bolts 12 to the fuselage 13 of the helicopter type aircraft. Rigidly fixed to the upper end of the column 10 is the stationary bevel gear 14 having a hub 15 and a downwardly facing abutment surface 16.

Extending upwardly through a bore 17 in the column 10 is the vertical drive shaft 18 driven by a suitable engine, not shown, carried in the fuselage 13. Fixed to the top end 19 of the drive shaft 18 is the gear box or yoke indicated generally at 20 having the top plate 21 to which the top end 19 of the drive shaft 18 is secured; the bottom plate 22 which mounts on antifriction thrust bearing 23 which engages the abutment surfaces 16 of the hub 15 of the bevel gear 14; and the side plates 24, one for each of the rotor blades 25, which are rigidly interconnected with the bottom and top plates 22 and 21 of the gear box 20 to form an integral structure revolved by the drive shaft 18 about the vertical axis 26. A suitable thrust collar 27 is fixed to the drive shaft 18 and engages the top surface 28 of the bevel gear 14 to limit downward movement of the drive shaft 18 and gear box 20 relative to the bevel gear 14 and column 10.

Fixed to the top plate 21 of the gear box 20 are a series of radially disposed blade support plates 29 each carrying a pin 30 upon which the bifurcated inner ends 31 of the blade support spars 32 are pivotally mounted to swing up and down about the axes 33. The rotor blades 25 may take the form of a suitable airfoil section, FIG. 8, rigidly fixed to the spars 32 having the leading edge 34 and trailing edge 34a.

The rotor blades 25 are swung up-and-down on the pivot pins 30 during the rotation fo the gear box 20 by power applied to drive shaft 18 by a plurality of crankshafts 35, one for each rotor blade 25, which are journaled in suitable bearings 36 carried in the side plates 26. Fixed to the inner ends of each crankshaft 35 are the bevel pinions 37, each arranged to roll around in mesh with the common bevel gear 14 as the gear box revolves about the axis 26 so as to effect rotation of the crankshafts 35. On the outer end of each crankshaft is fixed a crank arm 38 having a crankpin 39 which is pivotally connected by a suitable ball joint connection 40 to a connecting rod 41 pivotally attached at its other end by a ball joint connection 42 to the spar 32 so that rotation of the crankshaft 35 causes up-and-down swinging movement of the blades 25. The orientation of the crank arms 38 is such that each blade 25 moves up and down approximately once for each revolution of the gear box 20. Preferably, diametrically opposite blades move up and down at the same time while circumferentially spaced pairs of diameterically opposite blades move at the same time in opposite up and down movements. Referring to FIG. 8, the forward rotary motion of the rotor blade 25 is indicated by the direction arrow 49 and the downward motion by the direction arrow 50, the resultant upward opposing force from the air being indicated by the force arrow 51 which is substantially at right angles to the chord of the air foil section of the rotor blade for maximum lift. In FIG. 8a is shown the situation in which the rotor blade is moving up as indicated by the arrow 52 with the resultant force from the air being indicated by the air force arrow 53 which is substantially parallel to the chord of the airfoil section of the rotor blade for minimum or no lift.

In FIG. 5 is shown a modified connecting rod which may take the form of a spring or other longitudinally resilient device 43 which is pivotally mounted at 44 on a crankpin 45 fixed to the crank arm 38 while its other end is pivotally mounted on a pin 46 carried in a lug 47 fixed to the spar 32 so as to provide cushioned control and actuation of the rotor blades 25.

FIGS. 6 and 7 show the arrangement in which rotor blades 48 may take the form of substantially full quarter segments substantially filling the circle of rotor rotation, the rotor blades 48 being fixed to the spars 32 and actuated in the same manner as the rotor blades 25 so as to provide greater lift and reduced rotor speeds.

While the apparatus herein disclosed and described constitutes a preferred form of the invention, it is also to be understood that the apparatus is capable of mechanical alteration without departing from the spirit of the invention and that such mechanical arrangement and commercial adaptation as fall within the scope of the appendent claims are intended to be included herein.

Having thus fully set forth and described this invention what is claimed and desired to be obtained by United States Letters Patent is:

1. A reciprocating propeller for helicopter type aircraft comprising in combination:
   (a) a gear box rotatable about a vertical axis and restrained against vertical axial movement on a fuselage of the aircraft,
   (b) a plurality of radially disposed and circumferentially spaced rotor blades pivotally mounted on said gear box to swing in vertical planes relative to said fuselage,
   (c) means for rotating said gear box from a source of power on said fuselage,
   (d) and means carried by said gear box and interconnected between said fuselage and said rotor blades operable by the rotation of said gear box on said fuselage to reciprocate said rotor blades in vertical swinging movement so as to cause diametrically opposite rotor blades to move up and down in the same direction while other circumferentially spaced pairs of diametrically opposite blades move in the same direction but in opposite up and down movements from said first mentioned diametrically opposite rotor blades.

2. A reciprocating propeller for helicopter type aircraft comprising in combination:
   (a) a gear box rotatable about a vertical axis and restrained against vertical axial movement on a fuselage of the aircraft,
   (b) a plurality of radially disposed and circumferentially spaced rotor blades pivotally mounted on said gear box to swing in vertical planes relative to said fuselage,
   (c) means for rotating said gear box from a source of power on said fuselage,
   (d) means carried by said gear box and interconnected between said fuselage and said rotor blades operable by the rotation of said gear box on said fuselage to reciprocate said rotor blades in vertical swinging movement so as to cause diametrically opposite rotor blades to move up and down in the same direction while other circumferentially spaced pairs of diametrically opposite blades move in the same direction but in opposite up and down movements from said first mentioned diametrically opposite rotor blades,
   (e) said last mentioned means including a common bevel gear fixed to said fuselage,
   (f) a crankshaft, one for each rotor blade rotatably journaled in said gear box to revolve about axes radially disposed relative to said vertical axis of rotation of said gear box,
   (g) a bevel pinion fixed on each of said crankshafts operatively engaging said common bevel gear,
   (h) crank arms on said crankshafts,
   (i) crank pins on the outer ends of said crank arms,
   (j) and connecting rods connected between said crankpins and said rotor blades.

3. A reciprocating propeller for helicopter type aircraft comprising in combination:
   (a) a gear box rotatable about a vertical axis and restrained against vertical movement on a fuselage of the aircraft,
   (b) a plurality of radially disposed and circumferentially spaced rotor blades pivotally mounted on said gear box to swing in vertical planes relative to said fuselage,
   (c) means for rotating said gear box from a source of power on said fuselage,
   (d) means carried by said gear box and interconnected between said fuselage and said rotor blades operable by the rotation of said gear box on said fuselage to reciprocate said rotor blades in vertical swinging movement so as to cause diametrically opposite rotor blades to move up and down in the same direction while other circumferentially spaced pairs of diametrically opposite blades move in the same direction but in opposite up and down movements from said first mentioned diametrically opposite rotor blades,
   (e) said last mentioned means including a common bevel gear fixed to said fuselage,
   (f) a crankshaft, one for each rotor blade rotatably journaled in said gear box to revolve about axes radially disposed relative to said vertical axis of rotation of said gear box,
   (g) a bevel pinion fixed on each of said crankshafts operatively engaging said common bevel gear,
   (h) crank arms fixed on and circumferentially oriented in the same radial direction on diametrically opposite pairs of crankshafts and in different radial directions for other pairs of diametrically opposite, crankshafts,
   (i) crankpins on the outer ends of said crank arms,
   (j) connecting rods connected between said crankpins and said rotor blades,
   (k) said connecting rods including a resilient yielding spring between said crankpin and rotor blade connections.

4. A reciprocating propeller for aircraft comprising in combination:
   (a) a yoke rotatable about an axis and restrained against axial movement on a fuselage of the aircraft,
   (b) a plurality of radially disposed and circumferentially spaced rotor blades pivotally mounted on said yoke to swing in planes passing through said axis of rotation of said yoke,
   (c) means for rotating said yoke on said fuselage,
   (d) means interconnected between said yoke and said rotor blades operable by the rotation of said yoke to cause diametrically opposite rotor blades to move up and down in the same direction while other circumferentially spaced pairs of diametrically opposite blades move in the same direction but in opposite up and down movements from said first mentioned diametrically opposite blades about their pivotal mountings on said yoke so that as each of said rotor blades move downward a centrifugal force action takes place which forces the compressed air from under each blade, forward and outward, then up over the leading edge of each blade causing a vortex action resulting in extreme low pressure and lift above said rotor blades.

5. A reciprocating propeller for aircraft comprising in combination:
   (a) a yoke rotatable about an axis and restrained against axial movement on a fuselage of the aircraft,
   (b) a plurality of radially disposed and circumferentially spaced rotor blades pivotally mounted on said yoke to swing in planes passing through said axis of rotation of said yoke,
   (c) means for rotating said yoke on said fuselage, (d) means interconnected between said yoke and said rotor blade operable by the rotation of said yoke to swing said rotor blades about their pivotal mountings on said yoke to cause diametrically opposite rotor blades to move up and down in the same direction while other circumferentially spaced pairs of diametrically opposite blades move in the same direction but in opposite up and down movements from said first mentioned diametrically opposite blades so as to set up aerodynamic action as created by the wing of a bee as the blade is pulled downward in flight.

6. A reciprocating propeller for helicopter type aircraft comprising in combination:
 (a) a gear box rotatable about a vertical axis and restrained against vertical movement on a fuselage of the aircraft,
 (b) a plurality of radially disposed and circumferentially spaced rotor blades pivotally mounted on said gear box to swing in vertical planes relative to said fuselage,
 (c) means for rotating said gear box from a source of power on said fuselage,
 (d) means carried by said gear box and interconnected between said fuselage and said rotor blades operable by the rotation of said gear box on said fuselage to reciprocate said rotor blades in vertical swinging movement so that diametrically opposite blades move up and down in the same direction while circumferentially spaced pairs of diametrically opposite blades move in the same direction but in opposite up and down movements from said first mentioned diametrically opposite blades.

7. A reciprocating propeller for helicopter type aircraft comprising in combination:
 (a) a gear box rotatable about a vertical axis and restrained against vertical movement on a fuselage of the aircraft,
 (b) a plurality of radially disposed and circumferentially spaced quarter segment rotor blades pivotally mounted on said gear box to swing up and down relative to said fuselage,
 (c) means for rotating said gear box from a source of power on said fuselage,
 (d) and means carried by said gear box and interconnected between said fuselage and said rotor blades operable by the rotation of said gear box on said fuselage to reciprocate said rotor blades in vertical swinging movement so that diametrically opposite blades move up and down in the same direction while circumferentially spaced pairs of diametrically opposite blades move in the same direction but in opposite up and down movements from said first mentioned diametrically opposite blades.

References Cited by the Examiner
UNITED STATES PATENTS

| | | | |
|---|---|---|---|
| 1,577,461 | 3/26 | Glasser | 230—251 |
| 1,799,192 | 4/31 | Schallert | 170—159 |
| 1,893,395 | 1/33 | Breguet | 170—160.25 |
| 1,947,560 | 2/34 | Manasek | 170—149 |
| 2,026,917 | 1/36 | Smith | 170—160.25 |

JULIUS E. WEST, *Primary Examiner.*